(12) United States Patent
Lovell, Jr.

(10) Patent No.: US 7,539,502 B2
(45) Date of Patent: May 26, 2009

(54) SYSTEM AND METHOD FOR INTELLIGENT DYNAMIC MESSAGE ADDRESSING

(75) Inventor: Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 685 days.

(21) Appl. No.: 11/137,351

(22) Filed: May 26, 2005

(65) Prior Publication Data
US 2005/0265542 A1 Dec. 1, 2005

Related U.S. Application Data

(60) Provisional application No. 60/574,995, filed on May 28, 2004.

(51) Int. Cl.
H04W 4/00 (2006.01)
H04W 40/00 (2006.01)
(52) U.S. Cl. ............... 455/466; 455/445; 455/432.1
(58) Field of Classification Search .......... 455/432.1, 455/445, 466
See application file for complete search history.

(56) References Cited

U.S. PATENT DOCUMENTS

| 5,867,788 | A | * | 2/1999 | Joensuu | ............ 455/445 |
| 5,915,222 | A | | 6/1999 | Olsson et al. | |
| 6,487,602 | B1 | | 11/2002 | Thakker | |
| 6,658,260 | B2 | | 12/2003 | Knotts | |
| 6,684,073 | B1 | * | 1/2004 | Joss et al. | ............ 455/433 |
| 2004/0180621 | A1 | * | 9/2004 | Fowler | ............ 455/39 |
| 2004/0180678 | A1 | | 9/2004 | Smith et al. | |

OTHER PUBLICATIONS

International Search Report & Written Opinion, May 4, 2006.

* cited by examiner

*Primary Examiner*—Vincent P Harper
*Assistant Examiner*—Marisol Figueroa
(74) *Attorney, Agent, or Firm*—Edell, Shapiro & Finnan LLC

(57) ABSTRACT

A method for dynamically modifying the "from" address in SCCP-level address in an SS7 message. An inter-carrier vendor (ICV) or intermediary prearranges with a domestic carrier and an inter-network network (e.g., Teleglobe) to replace the ICV's predetermined static "from" SCCP-level address with a different "from" SCCP-level address. The different address might be selectively or dynamically employed based on an identity of a source wireless carrier, an identity of a destination wireless carrier, a directory number of a source mobile station, or a directory number o f a destination mobile station. The different address may also be used to indicate branding or the fact that a carrier has merged or has acquired another carrier.

20 Claims, 10 Drawing Sheets

```
SRIForSM
MTP OPC           001-044-246 (GW)
MTP DPC           001-044-230 (Teleglobe)

SCCP CallingParty 1-703-9618308 (GW)
SCCP CalledParty  65-9650-2799 (MSISDN)

GSM MAP MSISDN              65-9650-2799 (MSISDN)
GSM MAP SM-RP-PRI           N/A
GSM MAP Svc Cntr Addr 1-703-9618308 (SMSC)
```

```
FSM
MTP OPC           001-044-246 (GW)
MTP DPC           001-044-230 (Teleglobe)

SCCP CallingParty 1-703-9618308 (GW)
SCCP CalledParty  65-9619-7780 (MSC)

GSM MAP SM-RP-DA    xxx...xxx (IMSI)
GSM MAP SM-RP-OA    ?
GSM MAP SM-RP-UI    Encoded SMS Msg
GSM More Messages   1
```

*FIG. 14*

SYSTEM AND METHOD FOR INTELLIGENT DYNAMIC MESSAGE ADDRESSING

This application claims the benefit of U.S. Provisional Application No. 60/574,995, filed May 28, 2004, which is herein incorporated by reference in its entirety.

BACKGROUND

1. Field of the Invention

The present invention relates generally to telecommunications services. More particularly, the present invention relates to Dynamic Message Addressing capabilities of an SS7 Subsystem in connection with Short Message Service (SMS) message routing, processing, and delivery infrastructure that enables mobile carriers to exchange text and data messages across all carriers, across all wireless protocols, and around the world.

The following acronyms are used throughout this description.

| Term | Meaning |
| --- | --- |
| ANSI | American National Standards Institute |
| BIB | Backward Indicator Number |
| BS | Base Station |
| BSN | Backward Sequence Number |
| CCITT | Consultative Committee on International Telegraphy and Telephony |
| CCS | Common Channel Signaling |
| CDMA | Code Division Multiple Access |
| CMSDB | Call Management Services Database |
| CRC | Cyclic Redundancy Check |
| DN | Directory Number |
| DPC | Destination Point Code |
| E.164 | ITU international telephone numbering plan recommendation |
| EIA | Electronic Industry Association |
| ESN | Electronic Serial Number |
| FCS | Frame Check Sequence |
| FIB | Forward Indicator Bit |
| FISU | Fill-In Signal Unit |
| FSN | Forward Sequence Number |
| GMSC | Gateway MSC |
| GSM | Global System for Mobile Communication |
| GT | Global Title |
| GTT | Global Title Translation |
| HLR | Home Location Register |
| ICV | Inter-Carrier Vendor |
| IMSI | International Mobile Station Identity |
| IN | Identification Number |
| IP | Internet Protocol |
| ISO | International Standards Organization |
| ISUP | ISDN User Part |
| ITU | International Telecommunication Union |
| IWMSC | Interworking MSC |
| LI | Length Indicator |
| LSSU | Link Status Signal Unit |
| MAP | Mobile Application Part |
| MDN | Mobile Directory Number |
| MIN | Mobile Identification Number |
| MO | Mobile Originated |
| MS | Mobile Subscriber |
| MSC | Mobile Switching Center |
| MSISDN | Mobile Station ISDN Number |
| MSU | Message Signal Unit |
| MT | Mobile Terminated |
| MTP | Message Transfer Part |
| NANP | North American Numbering Plan |
| NPDB | Number Portability Database |

2. Background of the Invention

SS7 concerns itself with the signaling component of the initiation, management, and termination of telecommunication services, including point-to-point telephone calls.

In a telephony context, "signaling" means the passing, from one point to another, of information and instructions relevant to the setting up or supervision of a telephone call.

To initiate a call, a telephone subscriber lifts the handset off its rest, which, in American English, is commonly referred to 'going off hook.' This off-hook state is a signal to the central office or "exchange" to be ready to receive the number of the called subscriber. As soon as appropriate receiving equipment has been connected to the line, the exchange signals dial tone to the calling subscriber who then dials the wanted number. The subscriber, in due course, receives advice from the exchange about the status of the call, namely, a ringing signal (indicating that the wanted line is being rung), an engaged or busy tone signal (indicating that the wanted line is already busy with another call), an equipment busy tone signal (indicating congestion somewhere between the called exchanged and the calling line), or some other specialized tone, or prerecorded message.

These are the signals and tones with which the telephone subscribers themselves are concerned. Telephone signaling is however also concerned with the signaling of information between exchanges. See, generally, Graham Langley, *Telecommunications Primer* ($2^{nd}$ Edition), Pitman Publishing, London, 1986.

More specifically, SS7 is what runs public wireless and wireline networks. It is the communications network for the communications network, that includes both a suite of protocols as well as an architecture.

When a user picks up the telephone in a home, or one connected to, e.g., a company's private branch exchange (PBX), the telephone connects to a predetermined local telephone exchange. The exchange then routes the call using SS7 protocols over SS7 links. In seconds, SS7 can send a call around the world through all kinds of equipment. In case, for example, where the person being called has moved to a different state in the United States, SS7 will find out where. If the intended recipient is out and has voice-mail, SS7 will route the call to the mailbox, wherever it may be.

In addition, when one dials a mobile phone or sends a text message, the SS7 network finds out where in the world that mobile phone is and routes the call there, making sure the appropriate charges are logged. SS7 can also reroute a call when a mobile user roams into the domain of another switching center, or cut off a call when a prepaid service runs out of money.

In short, SS7 is a dedicated packet switching network that carries command and control information. It is separate and apart from the circuit switching network of the Public Switched Telephone Network (PSTN) that carries actual telephone calls. In effect, SS7 is a private, back-channel facility through which the different elements within a telecommunications environment (e.g., telephone switches) may, as an example:

Exchange critical information (such as SMS messages, call routing data, etc.), or Manage the allocation and de-allocation of system resources (e.g., actual voice circuits) during the creation, utilization, and destruction of telephone call delivery paths through the PSTN.

As summarized on a website belonging to Cisco (San Jose, Calif.), in the mid-1960s, the CCITT (now the ITU) developed a digital signaling standard called Signaling System #6. SS6 was based on a packet-switched, proprietary data network. SS6 used 2.4 Kbps data links to send packets of data to distant switches to request services. This was the first use of packet switching in the PSTN. SS6 packets consisted of 12 signal units of 28 bits each placed into a data block.

SS7 began deployment in 1983, and gradually phased out SS6. It was initially used only in the interoffice network (from central office to central office), but has gradually expanded and is now deployed in local central offices as well. SS7 provides a global standard for call setup, routing, and control.

The first use of SS7 was not for call setup and teardown, but rather for accessing databases. Toll free "800" numbers provided a problem for switches in that they could no longer route based on area code. A second "real number" for each 800 number needed to be placed in a centralized database which multiple central offices could access.

An SS7 network consists of an interconnected set of elements or components. The elements within an SS7 network are referred to as Signaling Points (SPs). Each SP is assigned its own unique Point Code (PC) that serves as an address within the SS7 network which other SPs may employ when dispatching messages. An SS7 PC may be thought of as being similar to an Internet Protocol (IP) address on the Internet. PCs are carried within all of the messages that travel through an SS7 network to identity the sender and the recipient of a message—the PC of the sender of a message is referred to as the Origination PC (OPC) and the PC of the recipient of a message is referred to as the Destination PC (DPC).

In the United States an American National Standards Institute (ANSI) version of SS7 is utilized and a PC is a 24-bit value that can be expressed in the form:

N.C.M where N is an 8-bit value that identifies a Network component (and may contain a value in the range 0 . . . 255 [inclusive]), C is an 8-bit value that identifies a Cluster component (and may contain a value in the range 0 . . . 255 [inclusive]), and M is a 8-identifies bit value that identifies a Member component (and may contain a value in the range 0 . . . 255 [inclusive]). Using this scheme, a total of 16,644,864 PCs are available for assignment:

| Network | Usage |
| --- | --- |
| 0 | Not Used |
| 1 | Cluster values 1, . . . 255 assigned as 'quasi network' codes to small entities |
| 2 | Cluster values 1, . . . 255 assigned as 'quasi network' codes to small entities |
| 3 | Cluster values 1, . . . 255 assigned as 'quasi network' codes to small entities |
| 4 | Cluster values 1, . . . 255 assigned as 'quasi network' codes to small entities |
| 5 | Cluster values 1, . . . 255 and Member values (0, . . . 255) assigned as blocks to individual entities |
| 6 | Available for complete assignment |
| . | |
| . | |
| . | |
| 254 | Available for complete assignment |
| 255 | Reserved For Future Use | where network values 1 through 5 contribute a total of 326,400 possible values (5 Network values*255 Cluster values*256 Member values=326,400 values) and network values 6 through 254 contribute a total of 16,318,464 values (249 Network values*256 Cluster values*256 Member values=16,318,464 values).

As an example, the ANSI SS7 PC 2.16.3 could be represented in binary as 00000010 00010000 00000011 or as the decimal value 135171.

In parts of Europe an International Telecommunication Union (ITU) version of SS7 is utilized and a PC is a 14-bit value that can be expressed in the form:

Z.A.M where Z is a 3-bit value that identifies a Zone component (and may contain a value in the range 0 . . . 7 [inclusive]), A is an 8-bit value that identifies an Area or Network component (and may contain a value in the range 0 . . . 255 [inclusive]), and M is a 3-bit value that identifies a Member component (and may contain a value in the range 0 . . . 7 [inclusive]).

As an example, the ITU SS7 PC 2.16.3 could be represented in binary as 010 00010000 011 or as the decimal value 4227.

In other portions of the world, still other versions of SS7 are utilized, and as a consequence, the local PC size and PC structure is altogether different—e.g., in Japan, PCs are 16-bit values.

There are three types of SS7 SPs: Service (or Signal) Switching Point (SSP), Service (or Signal) Control Point (SCP), and Signal Transfer Point (STP).

An SSP is basically an end-point within an SS7 environment and is typically some type of switching facility, for example a local exchange or a central office. An SSP is connected to an STP by one or more SS7 Access (A) Links. In topology diagrams, an SSP is typically depicted or represented using the symbol shown in FIG. 1.

An SCP typically comprises one or more database environments (e.g., a Call Management Services Database [CMSDB] for translating toll-free numbers, a Number Portability Database [NPDB] for translating ported numbers, etc.) and the associated application software. Each of the database environments that is hosted by an SCP is identified by a unique Subsystem Number (SSN). Thus one may address a message to a specific database on a specific SCP using the combination of the SCP's PC and the appropriate SSN. The combination of an SCP PC and an SSN may be thought of as being functionally analogous to the combination of an IP address and a port number—i.e., the combination uniquely identifies a specific end-point entity. An SCP is connected to an STP by one or more SS7 Access (A) Links. In topology diagrams, an SCP is typically depicted or represented using the symbol shown in FIG. 2.

An STP is, principally, a router, accepting incoming messages and immediately dispatching them to their designated destination PC. There are different classes or levels of STPs, including the National STP (which is capable of routing messages only to other SPs that understand its specific version [ANSI, ITU, etc.] of SS7) and the Gateway or International STP (which is capable of performing the necessary conversion operations to bridge the protocol 'gap' between different versions of SS7). As described above, ANSI and ITU PCs are quite different and one of the fundamental services that a Gateway or International STP offers is PC mapping and conversion. Additionally, an STP may optionally support Global Title Translation (GTT), a facility through which the address (i.e., a PC and a SSN) of the appropriate target SCP is dynamically derived from data tables that are stored locally on the STP and a Global Title (GT), an alias value (e.g., a mobile telephone number, a toll-free telephone number, etc.) that is contained in an incoming message. STPs are always deployed in mated pairs. An STP is connected to its mate by a set of SS7 Cross (C) links. A set of mated STPs are connected to another set of mated STPs by a set of SS7 Bridge (B) links. In topology diagrams, an STP is typically depicted or represented using the symbol shown in FIG. 3.

FIG. 4 illustrates a hypothetical (albeit exceedingly simple) ANSI SS7 network. In this diagram, two pairs of mated STPs (at PCs 1.1.8/1.1.9 and 2.1.8/2.1.9) support eight SSPs (at PCs 1.1.2, 1.1.3, 1.1.4, 1.1.5, 2.1.2, 2.1.3, 2.1.4, and 2.1.5) and two SCPs (at PCs 1.1.1 and 2.1.1). Message delivery routes would be defined between all of the different SPs (e.g., a message delivery route exists from the SP at PC 1.1.2 to the SP at PC 1.1.8, a message delivery route exists from the SP at PC 1.1.2 to the SP at PC 1.1.9, etc.), published, and for management purposes aggregated into routesets. Utilizing the published or advertised message delivery paths, the SPs within the network are thus able to properly direct all of the messages that must be exchanged between the SPs.

A four-level SS7 protocol stack that follows the layering concept of the Open Systems Interconnection (OSI) seven-layer reference model as defined by the International Standards Organization (ISO) supports the exchange of messages between SPs within an SS7 environment. With reference to FIG. 5, the Message Transfer Part (MTP) levels 1, 2, and 3 define various low-level messaging support (e.g., physical connections, message sequencing, error detection, message routing, etc.). The Signaling Connection Control Part (SCCP) provides connection-oriented and connectionless services and GTT. The Transaction Capabilities Applications Part (TCAP) supports the exchange of application-specific messages (e.g., a database query issued to and a response returned from an SCP). There are three distinct types of messages or Signal Units (SUs) that transit an SS7 environment—Fill-In Signal Units (FISUs), Link Status Signal Units (LSSUs), and Message Signal Units (MSUs). FISUs and LISUs convey heartbeat and other status information. MSUs are the real workhorse of SS7 and convey all of the call control information, database query and response information, SMS messages, etc. An MSU may be depicted as shown in FIG. 6.

The Frame Check Sequence (FCS) FCS contains a Cyclic Redundancy Check (CRC) value that is utilized to detect and, if possible, correct message transmission errors. The Signaling Information Field (SIF) contains higher-level (e.g., SCCP, TCAP, etc.) signaling information and a Routing Label (RL) comprising the OPC and DPC of the message. The Service Information Octet (SIO) identifies the nature of the MSU and the higher-level (e.g., SCCP, TCAP, etc.) 'user' to which the contents of the SIF should be delivered for decoding and processing. The Length Indicator (LI) identifies the type of the SU. The contents of the Forward Indicator Bit (FIB), Forward Sequence Number (FSN), Backward Indicator Bit (BIB), and Backward Sequence Number (BSN) are utilized for sequencing, acknowledgement, and error recovery purposes. The Flag field contains the static value 01111110 and identifies the end of a MSU.

The SIF is effectively the payload of the MSU. It carries the higher-level (e.g., SCCP, ISUP, etc.) signaling information and contains, amongst other fields, the RL. An RL identifies principally the PC of the SP that originated the MSU (i.e., the OPC) and the PC of the intended recipient SP of the MSU (i.e., the DPC).

With this basic understanding of SS7 now established, briefly described next is SMS and the utilization of SS7 within an SMS infrastructure.

Publications from various of the worldwide authoritative bodies describe the organization and operation of wireless telecommunications environments and services or features within those environments such as SMS. For example, for the Global System for Mobile communication (GSM) environment the Technical Specifications (TSs) are maintained by the 3$^{rd}$ Generation Partnership Project (http://www.3gpp.org), and numerous volumes are available in the popular press (including, amongst others, Michel Mouly and Marie-Bernadette Pautet, *The GSM System For Mobile Communications*, Europe Media Duplication S.A., 1993).

Within a (hypothetical) wireless telecommunications environment like that shown in FIG. 7, one typically has some number of Mobile Subscribers (MSs) 70. An example of a MS 70 would be a cellular telephone, which in effect is a portable radio transmitter/receiver. An MS is assigned (at least) two identifying values—a public Directory Number (DN) (the advertised telephone number, typically E.164-compliant, that individuals may dial to reach the MS) and a private Identification Number (IN) (a behind-the-scenes number that is utilized during call processing, routing, etc. operations). Depending upon the MS' technology (GSM, non-GSM such as Code Division Multiple Access [CDMA]) the DN and the IN are ascribed the following designations:

| Technology | Value | Designation | Description |
|---|---|---|---|
| GSM | DN | MSISDN | Mobile Station ISDN |
| | IN | IMSI | International Mobile Subscriber Identity |
| Non-GSM | DN | MDN | Mobile Directory Number |
| | IN | MIN | Mobile Identification Number |

A MS communicates with a Base Station (BS), each of which consists of a radio antenna and supporting systems. The coverage area that a BS supplies is commonly referred to as a 'cell,' several of which are identified by 72a-72d. By strategically distributing BSs a wireless telecommunications service provider can 'join together' a group of cells to provide coverage for incrementally larger contiguous areas. One or more BSs are connected by land lines to a Mobile Switching Center (MSC) 73, a specialized telephone switch that serves as an entry/exit point for:

The carrier's SS7 environment 75

The PSTN 76 thus facilitating the passing of traffic between the wireless environment and the wireline environment.

As a MS 70 roams (i.e., as it moves from one coverage area to another) the wireless telecommunications service provider's back-end systems (HLR 78 and VLR 79) automatically keep track of the location of the MS—so that calls that are originated from the MS 70 may be efficiently processed and calls that are terminated to the MS 70 may be properly delivered—through a carefully choreographed exchange of SS7 messages. To support this 'mobility management' capability critical information is maintained in two different database environments:

1) Home Location Register (HLR) 78. At a logical level there is one HLR 78 within each carrier's environment; at a physical level this facility may be implemented as a series of interconnected database environments. When a carrier activates service for a MS 70 an entry is made in this database. The database entry captures, for example, the MS' hidden Electronic Serial Number (ESN), the MS' Identification Number (the private number that is utilized behind the scenes during actual call processing and routing operations), the MS' DN (the public telephone number that individuals may dial to reach the MS), the identifier of the VLR for the current location of the MS (so that calls may be delivered to the MS), etc.

2) Visitor Location Register (VLR) 79. As a MS 70 roams a temporary entry is created in the VLR in the MSC that services the cell (i.e., the BS or cell 72a-72d) within which the MS 70 currently resides. Amongst other things, the database entry captures the temporary DN that is assigned to the MS 70 for purposes of call processing for the period of time that the MS is active in the cell.

The various specification documents that define SMS identify several new (SMS-specific) network elements, as is well known in the art. In brief, at a very high level, and in stylized form, those network elements may be summarized as shown in FIG. 8.

One or more Short Message Entities (SMEs) 80a, 80b, 80c send SMS messages to and receive SMS messages from a Short Message Service Center (SMSC or sometimes SC) 82. The SMSC is responsible for, amongst other things, relaying and, if necessary, temporarily storing SMS messages.

An SMS Gateway MSC (SMS-GMSC) 84 capability, possibly offered as a service by a suitably-equipped MSC, accepts SMS messages from a SMSC 82, appropriately interrogates HLR 78 to obtain routing information, and passes SMS messages on to the identified MSC 73.

An SMS Interworking MSC (SMS-IWMSC) 86 capability, possibly offered as a service by a suitably-equipped MSC, receives SMS messages from a MSC 73 and submits SMS messages to the identified SMSC 82.

As noted previously, the coordinated exchange of a series of well-structured SS7 messages is necessary to support the roaming of a MS 70. For example, such messaging is necessary to support the registration of a MS 70 within a new VLR 79, the updating of the 'current VLR' field of a MS' record in the HLR, the deregistration of a MS within an old VLR, etc. In CDMA-based wireless environments the TIA/EIA 41 (or IS-41D or ANSI-41D) Mobile Application Part (MAP) extensions to SS7 are typically utilized for this activity; in GSM wireless environments the GSM MAP extensions to SS7 are typically utilized for this activity. The TIA/EIA 41 MAP extensions and the GSM MAP extensions sit atop the TCAP layer of the SS7 protocol stack.

Thus, SS7 can be considered the 'glue' that ties together all of the pieces of the puzzle. By leveraging features of SS7, the present invention provides a methodology by which an inter-carrier vendor can customize certain messaging processes.

SUMMARY OF THE INVENTION

In accordance with the present invention, an inter-carrier vendor, or Intermediary, that routes, e.g., short message service (SMS) messages, is able to dynamically (a) identify and then (b) assign a "from" SCCP-level address of outgoing SS7 messages (associated with SMS messages) that it dispatches based on (a) the application of a defined set of rules or logic (which is dynamically configurable on a carrier-specific basis) and (b) the value of one or more data elements (the precise set of which are dynamically configurable on a carrier-specific basis). The Intermediary preferably works in a coordinated fashion with an international carrier, such as Teleglobe, to ensure that responses (by, for example, another international carrier) to dynamically-addressed SS7 messages that are issued by the Intermediary are properly routed (via, for example, GTT operations within Teleglobe) back to the Intermediary.

The Intermediary can thus employ a selected "from" SCCP-level address to more readily identify, e.g., the identity of a source wireless carrier, the identify of a destination wireless carrier, a directory number of a source or destination mobile station. This identification can be helpful for improved billing services, accounting, and branding of messages.

In an alternative embodiment, a "from" SCCP-level address is selected from a pool of such address depending on a particular rules set or predetermined logic and associated data.

These and other features of the present invention will be more readily appreciated upon a reading of the following detailed description in conjunction with the associated drawings.

BRIEF DESCRIPTION OF THE DRAWINGS

FIG. 14 shows a "from" SCCP-level address that can be dynamically changed in accordance with the present invention.

DETAILED DESCRIPTION

Figure 1:
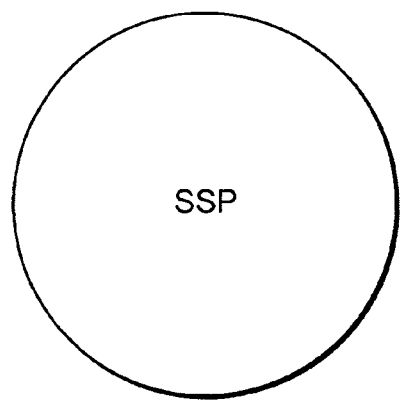
FIGS. 1-3 depict schematic symbols of basic public switched telephone network components employed in an ANSI SS7 network.
Figure 2:
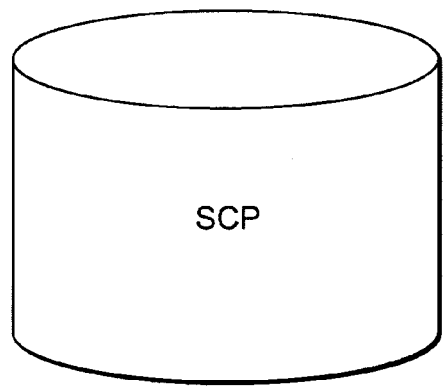
Figure 3:
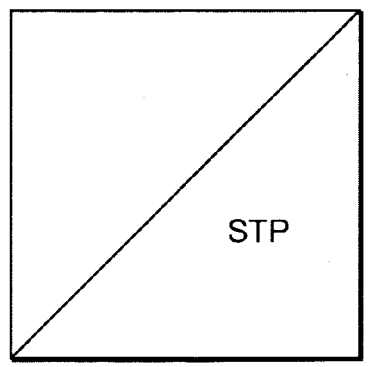
Figure 4:
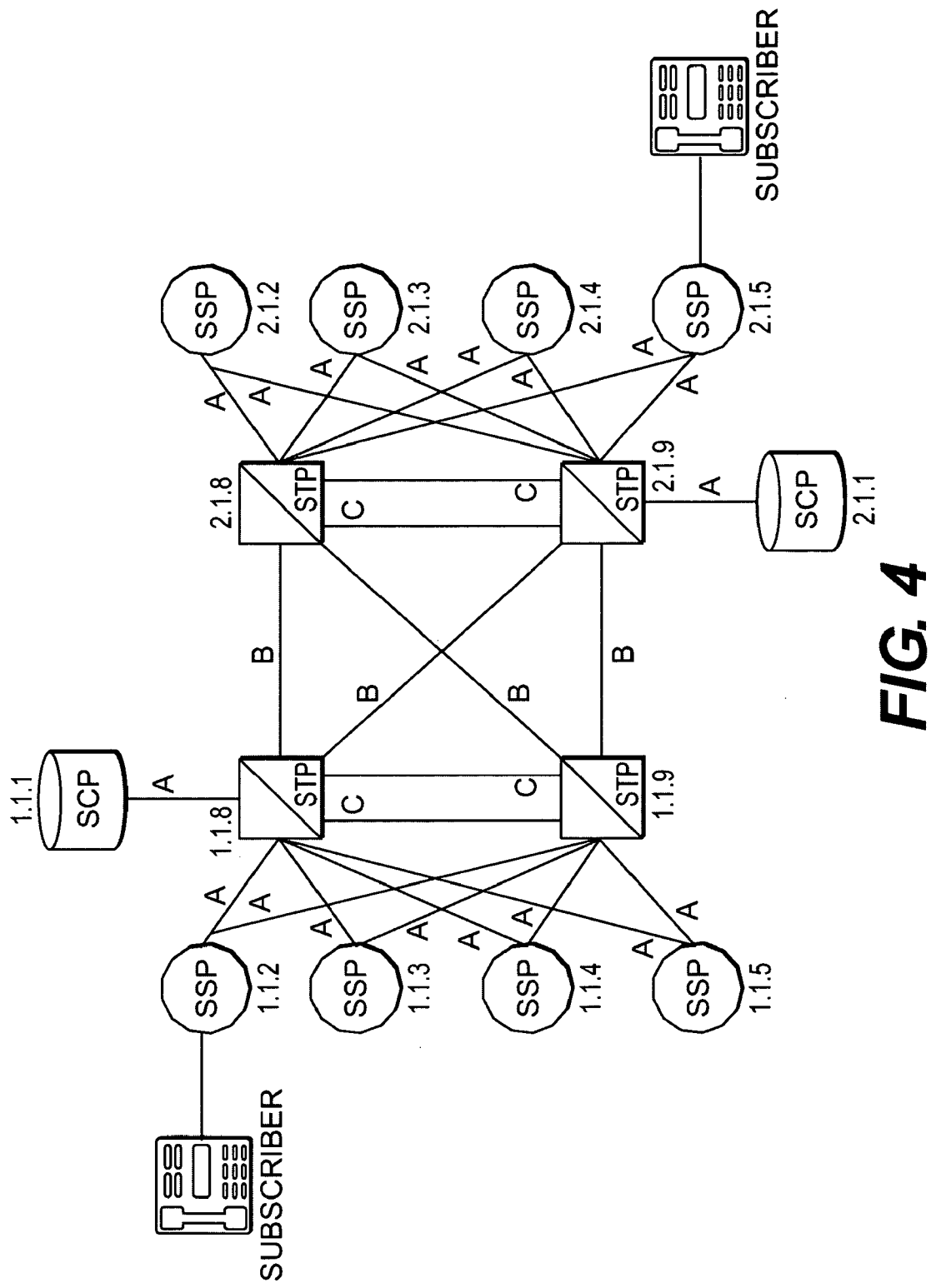
FIG. 4 illustrates a hypothetical ANSI SS7 network.
Figure 5:
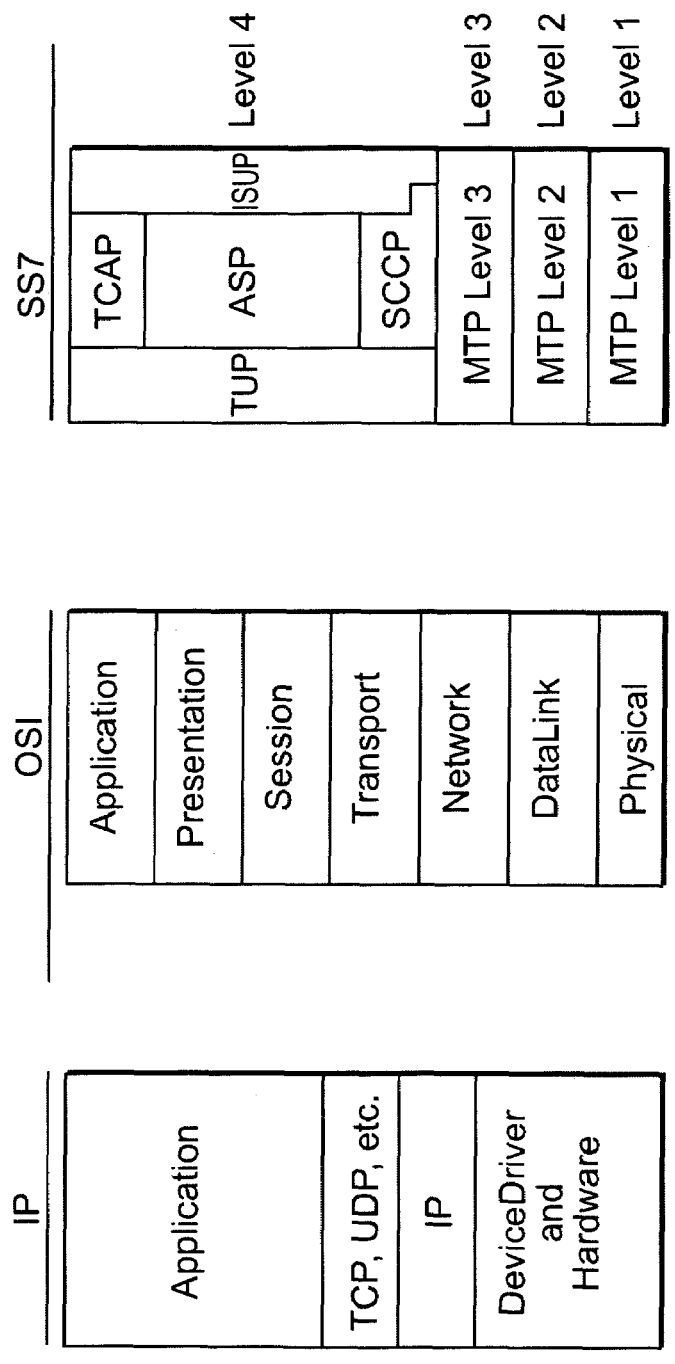
FIG. 5 juxtaposes IP, OSI and SS7 reference layers.
Figure 6:
FIG. 6 shows a conventional SS7 Message Signal Unit (MSU).
Figure 7:
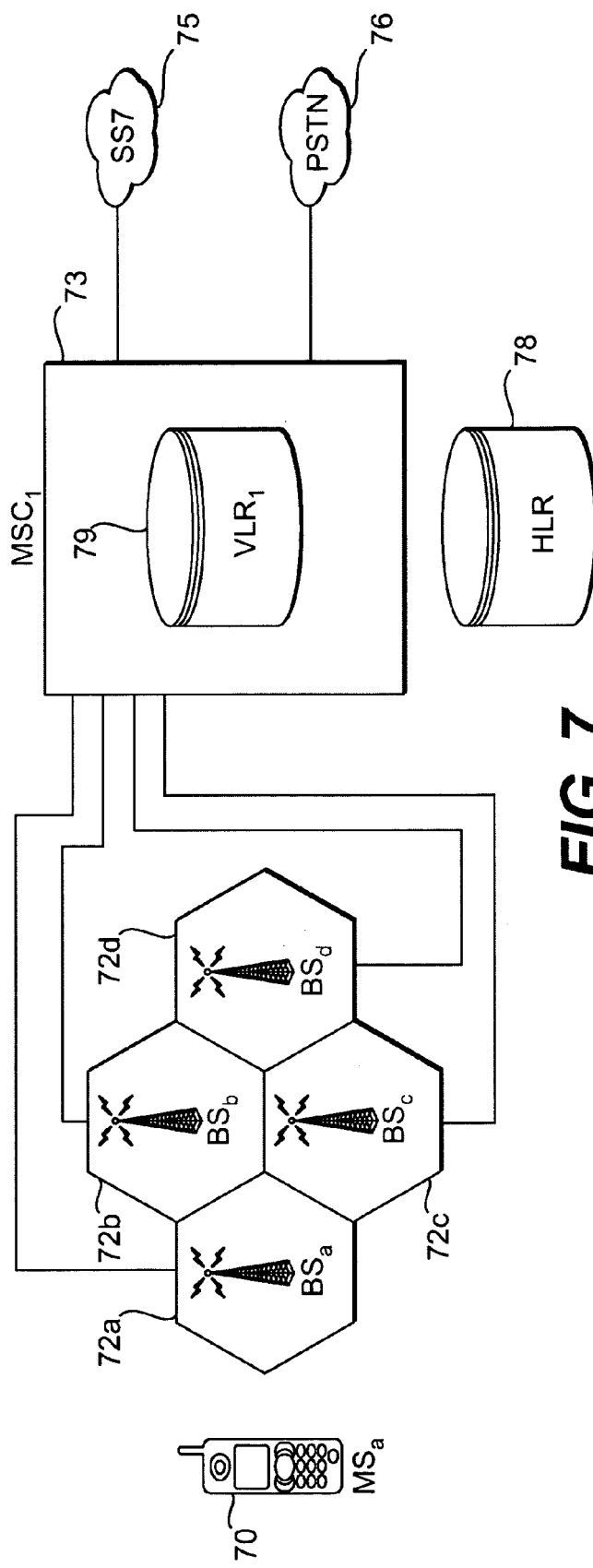
FIG. 7 shows a conventional wireless telephone network.
Figure 8:
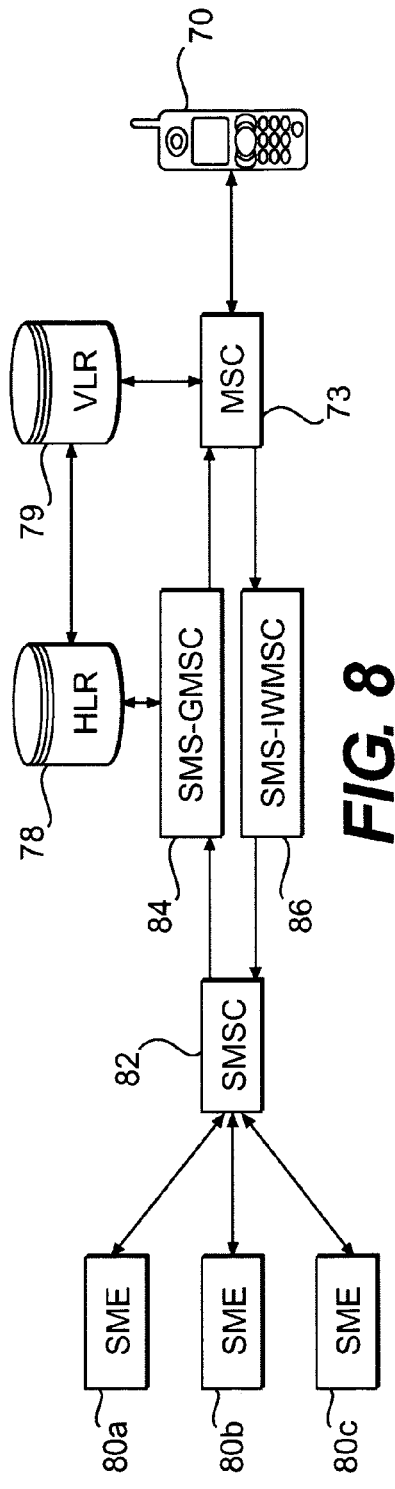
FIG. 8 shows a conventional SMS network architecture.
Figure 9:
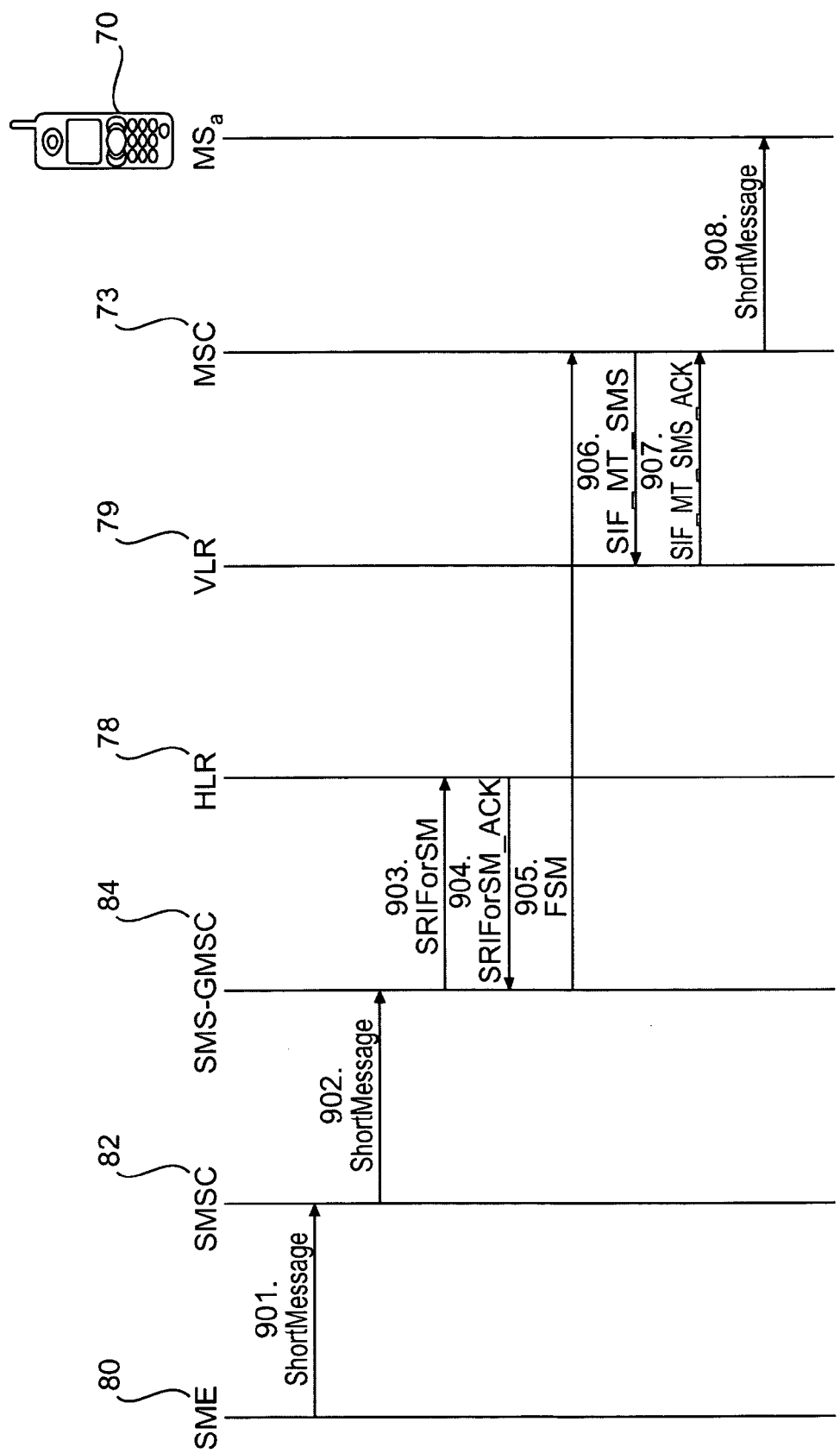
FIG. 9 shows the delivery of an SMS message to a mobile station.

To provide a substantive context for the present invention, consider for a moment the following illustrative example—the delivery of an SMS message to a MS (i.e., a Mobile Terminated [MT] message). The message flow that is associated with this activity may be summarized in the diagram of FIG. 9.

At Step 901, an SME 80 delivers an SMS message to the SMSC 82. The SMS message contains, amongst other things, the MSISDN of the recipient MS ($MS_a$) 70.

At Step 902, the SMSC 82 forwards the SMS message on to an SMS-GMSC 84.

At Step 903, the SMS-GMSC 84 issues a MAP_SEND_ROUTING_INFO_FOR_SM (SRIF or SM) to the HLR 78. The HLR 78 utilizes the MSISDN value in the MAP_SEND_ROUTING_INFO_FOR_SM message to retrieve the associated IMSI value and the address of the MSC that is currently servicing the MS 70.

At Step 904, a MAP_SEND_ROUTING_INFO_FOR_SM_ACK (SRIForSM_ACK) containing the retrieved information (the IMSI, the address of the servicing MSC, etc.) is returned to the SMS-GMSC 84.

At Step 905, the SMS-GMSC 84 transfers the SMS message to the MSC 73 that is currently servicing the recipient MS 70 by utilizing the returned routing address to issue a MAP_FORWARD_SHORT_MESSAGE (FSM) with the MS destination address set to the IMSI to the MSC.

At Step 906 and Step 907, the servicing MSC 73 issues a MAP_SEND_INFO_FOR_MT_SMS to the VLR to retrieve location, etc. information for the MS.

At Step 908, the MSC 73 actually dispatches the SMS message to the recipient MS ($MS_a$) 70.

Figure 10:
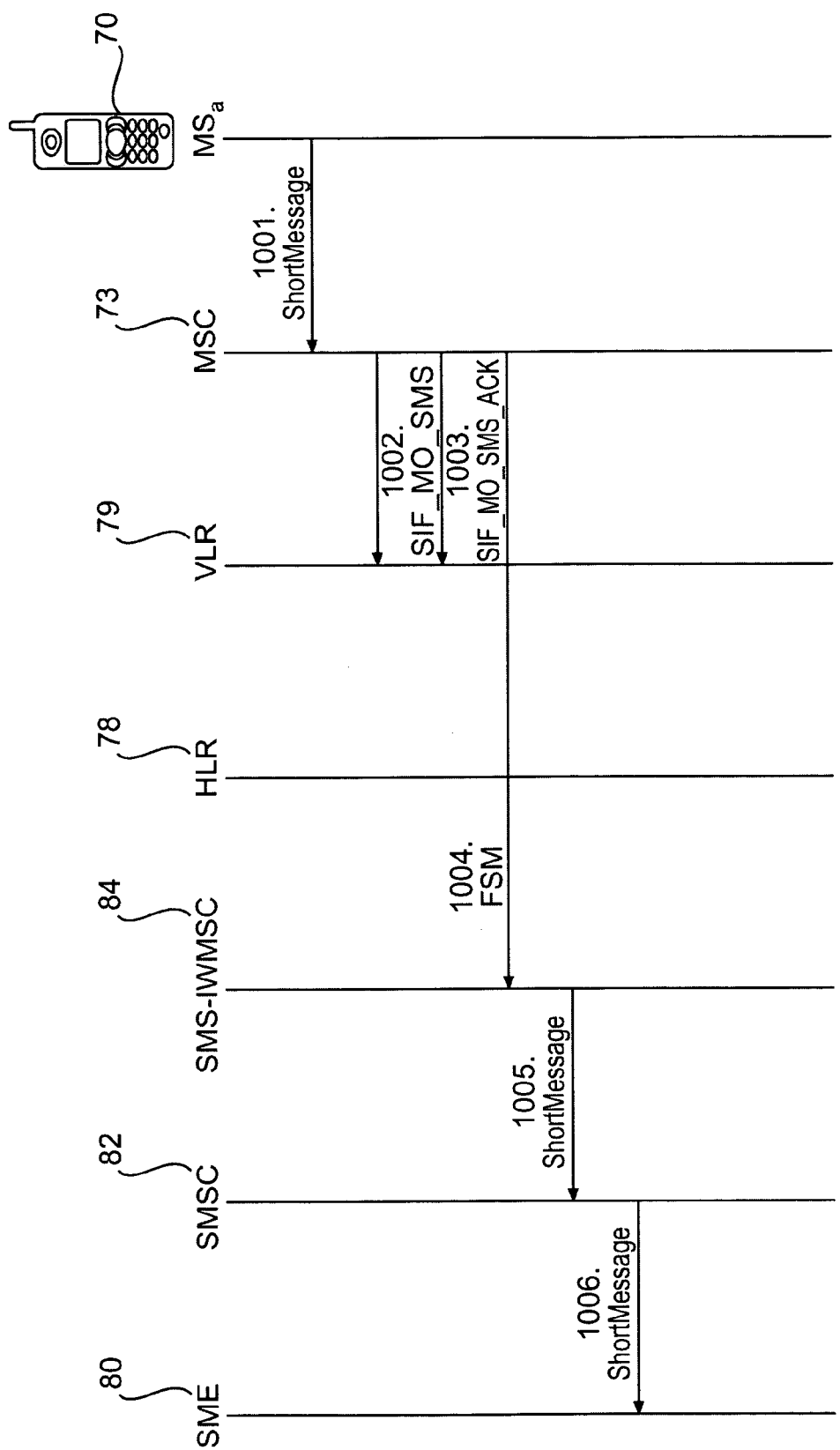
FIG. 10 shows the delivery of an SMS message from a mobile station.

Now consider the reverse case—the issuance of an SMS message by a MS 70 (i.e., a Mobile Originated [MO] message). The message flow that is associated with this activity may be summarized in the diagram of FIG. 10.

At Step 1001, the originating MS (MS$_a$) 70 issues an SMS message.

At Step 1002 and Step 1003, the servicing MSC 73 issues a MAP_SEND_INFO_FOR_MO_SMS to the VLR 79 to retrieve identification, location, and routing information for the MS.

At Step 1004, the servicing MSC 73 transfers the SMS message to the SMS-IWMSC 84 by utilizing local routing guides and the information about the MS that was retrieved previously from the VLR 79 to issue a MAP_FORWARD_SHORT_MESSAGE(FSM).

At Step 1005, the SMS-IWMSC 84 forwards the SMS message on to a SMSC 82.

At Step 1006, the SMSC 82 delivers the SMS message to the recipient SME 80.

Figure 11:
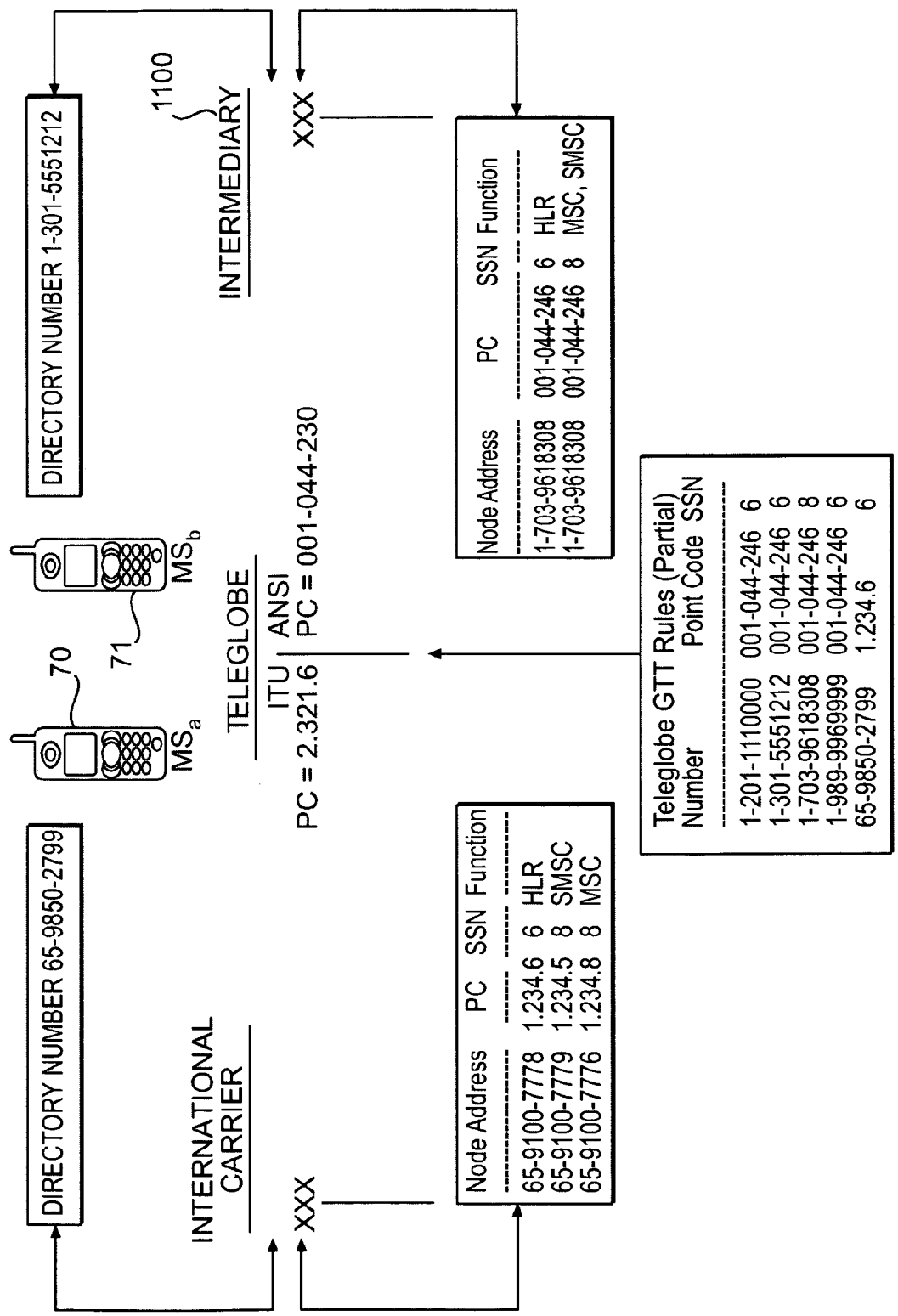
FIG. 11 depicts a framework for converting between domestic and international numbers.

To further explore aspects of the two sequences that were just presented we may utilize the framework depicted in FIG. 11.

Within this framework Teleglobe (a description of which can be found on the internet at "teleglobe.com") is indicated as an SS7 access and service provider. Teleglobe can be considered an inter-network network, in the sense that it provides connectivity between different stand-alone networks. It will be readily obvious to one of ordinary skill in the relevant art that other such providers may easily be substituted.

Additionally, an Intermediary is indicated as an Inter-Carrier Vendor (ICV) servicing some number of domestic wireless carriers. An illustrative example of key aspects of such an environment may be found in pending U.S. application Ser. No. 10/426,662.

It is noted that, for clarity, the various telephone numbers that are depicted are shown with embedded dashes ('-'). Additionally, please note that for added clarity certain data elements for selected of the messages are 'carried over' through the invocation→response messaging sequence. Also, in selected cases various of the logical GMSC, HLR, SMSC, etc. functionality is 'collapsed' under a single XXX designation. Finally, in certain cases and for simplicity, a final GTT operation is depicted when in reality an intermediate GTT operation is more likely to be encountered.

Consider the case where a MS, MS$_b$ 71, of a domestic carrier that is serviced by the Intermediary 1100 originates a SMS message that is addressed to (i.e., is destined for) MS$_a$ 70, a MS of an international carrier. MS$_a$ 70 has the DN 65-9850-2799 and MS$_b$ 72 has the DN 1-301-5551212.

Figure 12:
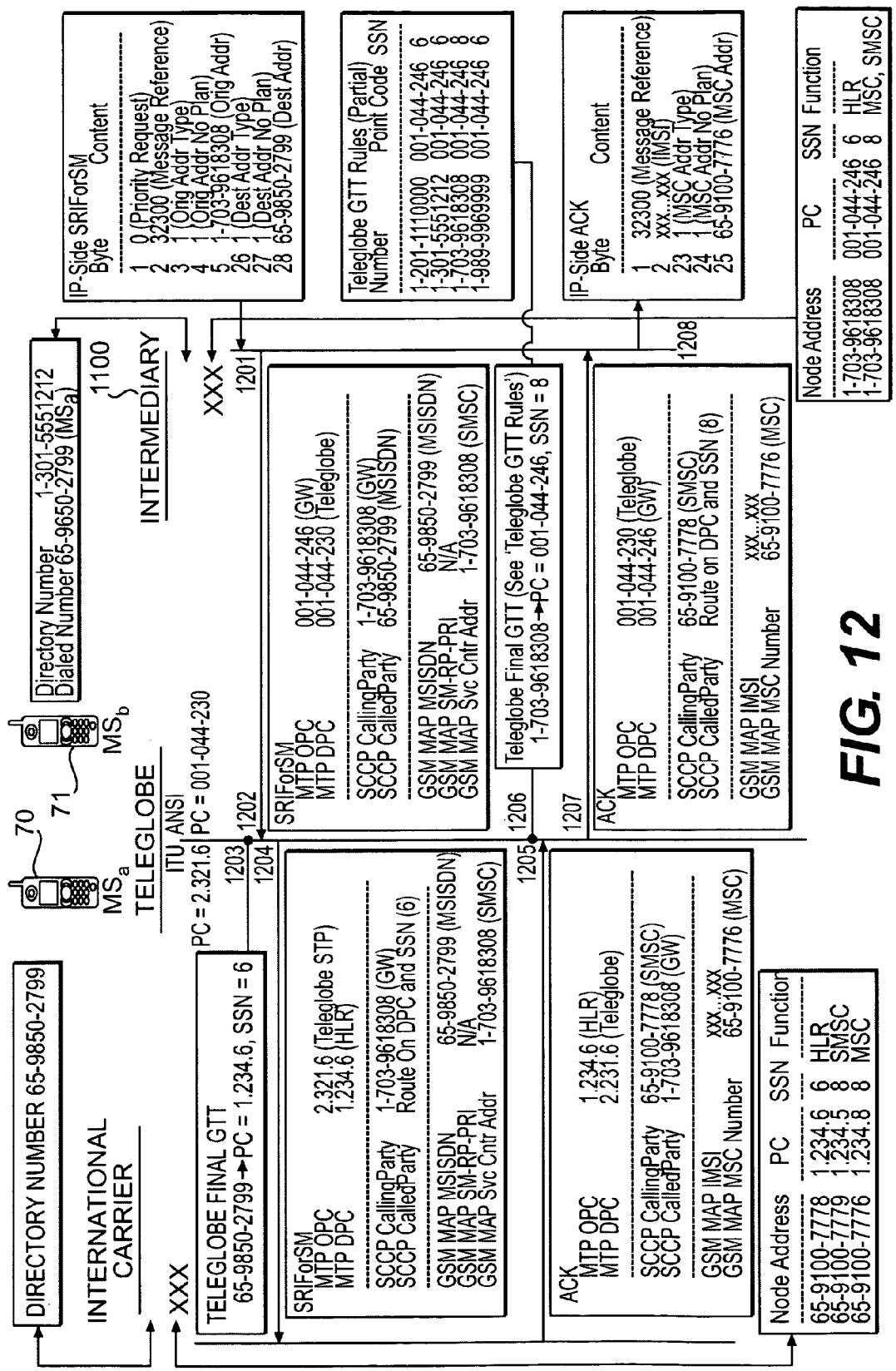
FIGS. 12 and 13 illustrate the processing of a message.

FIG. 12 summarizes, at a very high level, the processing of the messaging that arises under this case. In brief:

At Step 1201, an Intermediary SS7 Transmitter process constructs an IP-side SendRoutingInfoForSM (SRIForSM) message and submits that message to the IP side of the Intermediary's SS7 gateway platform.

At Step 1202, the Intermeidary's SS7 gateway platform, which resides at PC 001-044-246 and E.164 node address 1-703-9618308, constructs a SendRoutingInfoForSM (SRIForSM) request message and issues that message to Teleglobe's ANSI facing access point (at PC 001-044-230).

At Step 1203, Teleglobe completes the necessary message conversions (ANSI to ITU) and performs a GTT operation (for simplicity, illustrated here as a final GTT operation). The GTT operation 'maps' the DN of the recipient or destination MS (i.e., 65-9850-2799) to the PC 1.234.6.

At Step 1204, Teleglobe issues a converted and properly-addressed SendRoutingInfoForSM (SRIForSM) request message.

At Step 1205, after processing the SendRoutingInfoForSM (SRIForSM) request message a SendRoutingInfoForSM (SRIForSM) acknowledgement or response message is issued to Teleglobe's ITU facing access point (at PC 2.321.6).

At Step 1206, Teleglobe completes the necessary message conversions (ITU to ANSI) and performs a final GTT operation. The GTT operation 'maps' the E.164 address of the Intermediary's SS7 gateway platform (i.e., 1-703-9618308) to the PC 001-044-246, the PC of the Intermeidary's SS7 gateway platform.

At Step 1207, Teleglobe issues a converted and properly-addressed SendRoutingInfoForSM (SRIForSM) acknowledgement/response message to the Intermediary's SS7 gateway platform.

At Step 1208, the Intermediary's SS7 gateway platform receives the SendRoutingInfoForSM (SRIForSM) acknowledgement/response message on its SS7 side, constructs an IP-side SendRoutingInfoForSM (SRIForSM) acknowledgement/response message, and issues that message out its IP side for handling by an associated SMS message routing, processing, and delivery infrastructure (no shown).

Figure 13:
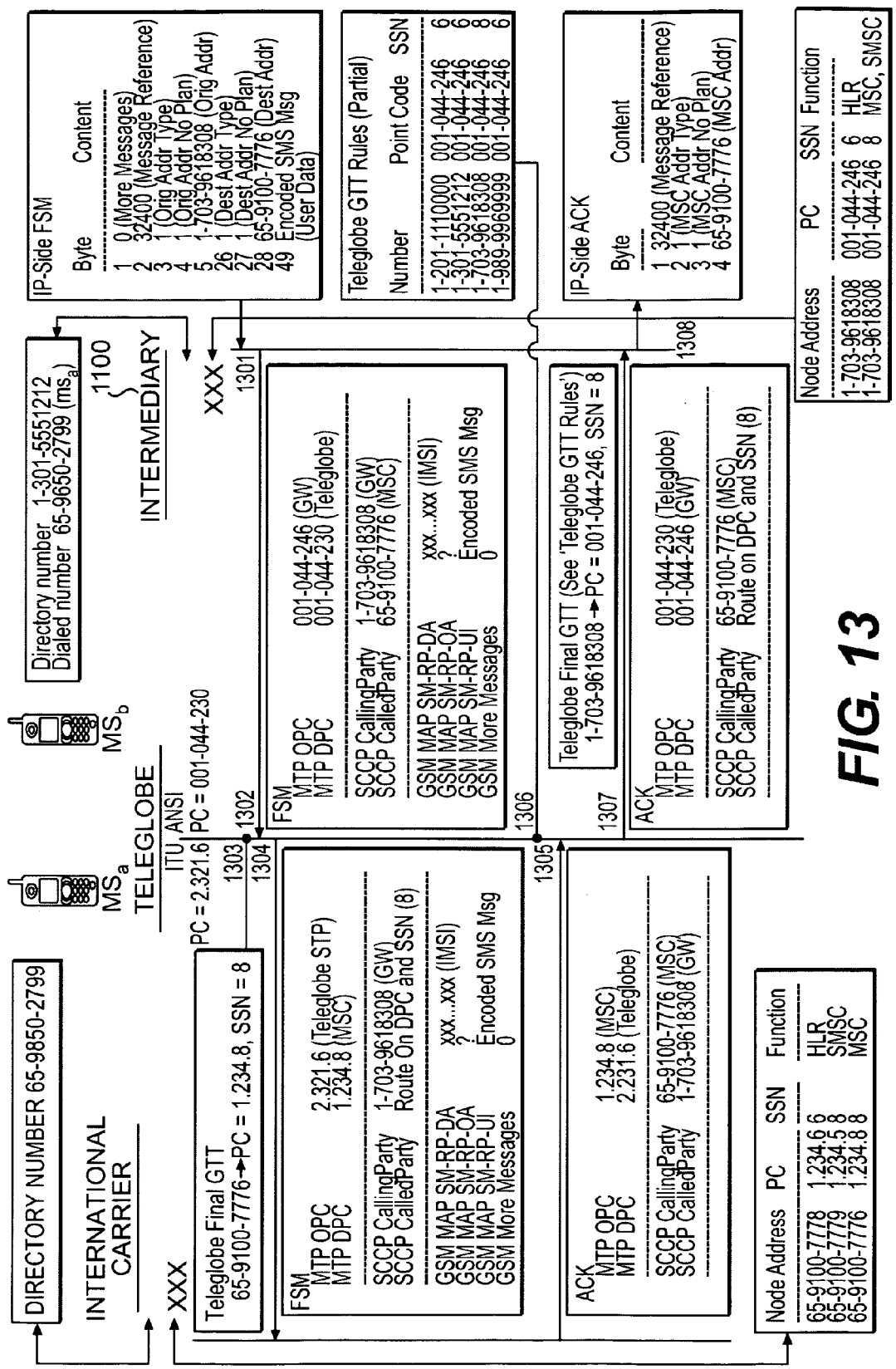

Following the successful completion of the preparatory SendRoutingInfoForSM (SRIForSM), Intermediary 1100 utilizes data elements from the received SendRoutingInfoForSM(SRIForSM) acknowledgement/response message to construct and dispatch a ForwardShortMessage (FSM) message to actually convey the SMS message itself. The diagram that is presented in FIG. 13 summarizes, at a very high level, the processing of the messaging.

At Step 1301, the Intermediary's SS7 Transmitter process constructs an IP-side ForwardShortMessage (FSM) message and submits that message to the IP side of the SS7 gateway platform.

As Step 1302, the Intermediary's SS7 gateway platform, which resides at PC 001-044-246 and E.164 node address 1-703-9618308, constructs a ForwardShortMessage (FSM) request message and issues that message to Teleglobe's ANSI facing access point (at PC 001-044-230).

At Step 1303, Teleglobe completes the necessary message conversions (ANSI to ITU) and performs a GTT operation (for simplicity, illustrated here as a final GTT operation). The GTT operation 'maps' the destination address (i.e., 65-9100-7780) to the PC 1.234.8.

At step 1304, Teleglobe issues a converted and properly-addressed ForwardShortMessage (FSM) request message.

At Step 1305, after processing the ForwardShortMessage (FSM) request message, a ForwardShortMessage (FSM) acknowledgement/response message is issued to Teleglobe's ITU facing access point (at PC 2.321.6).

As Step 1306, Teleglobe completes the necessary message conversions (ITU to ANSI) and performs a final GTT operation. The GTT operation 'maps' the E.164 address of InphoMatch's SS7 gateway platform (i.e., 1-703-9618308) to the PC 001-044-246, the PC of the Intermediary's SS7 gateway platform.

At Step 1307 Teleglobe issues a converted and properly-addressed ForwardShortMessage (FSM) acknowledgement/response message to the Intermediary's SS7 gateway platform.

At Step 1308, the Intermediary's SS7 gateway platform receives the ForwardShortMessage (FSM) acknowledgement/response message on its SS7 side, constructs an IP-side ForwardShortMessage (FSM) acknowledgement/response message, and issues that message out its IP side for handling by SMS message routing, processing, and delivery infrastructure (not shown) of Intermediary 100.

With the foregoing in mind, details of the present invention can now be more fully described.

Referring back to Step 1202 of FIG. 12 and Step 1302 of FIG. 13, one may observe that the SS7 messages that are dispatched by the Intermediary's 1100 SS7 gateway platform—SendRoutingInfoForSM (SRIForSM) under FIG. 12 and ForwardShortMessage (FSM) under FIG. 13—contain a static 'from' SCCP-level address (1-703-9618308), as shown in FIG. 14.

While this is functional, it may be desirable for Intermediary 1100, operating as an ICV, and thus providing a 'facade' behind which numerous domestic wireless carriers may reside, to optionally vary the 'from' SCCP-level address of the SS7 messages that it issues. Specifically, it may be desirable for Intermediary 1100, operating as an ICV, to optionally dynamically populate the 'from' SCCP-level address of an outgoing SS7 message that it dispatches based on (a) a dynamically configurable range of data elements (including, for example, the identity of the source wireless carrier, the identity of the destination wireless carrier, the DN of the source MS, etc.) and (b) a dynamically configurable body of application logic (that operates on or against, for example, the pool of data elements).

It is noted that the catalog of data elements that was presented above is illustrative only; it will be readily apparent to one of ordinary skill in the relevant art that numerous other data elements are easily possible.

The motivation for such a dynamic message addressing capability may include wireless carrier-specific business drivers (e.g., branding initiatives, MS management needs following a merger or acquisition, corporate privacy concerns, logical messaging segmentation, etc.) and ICV-specific initiatives (e.g., augmented or enhanced billing offerings, etc.).

A Dynamic Message Addressing component of the SS7 Subsystem of the Intermediary provides the capability just described. Working in a coordinated fashion with Teleglobe (as the instant SS7 access and service provider, although other such access/service entities may easily be substituted) Intermediary 1100 is able to dynamically (a) identify and then (b) assign the 'from' SCCP-level address of outgoing SS7 messages that it dispatches based on (a) the application of a defined set of rules or logic (which is dynamically configurable on a carrier-specific basis) and (b) the value of one or more data elements (the precise set of which are dynamically configurable on a carrier-specific basis). The 'working in a coordinated fashion with Teleglobe' element is significant, as Teleglobe's routing databases must be kept in synchronization with the Intermediary's routing databases to ensure that responses (by, for example, an international carrier) to dynamically-addressed SS7 messages that are issued by Intermediary 1100 are properly routed (via, for example, GTT operations within Teleglobe) back to Intermediary 1100.

For purposes of illustration consider the following simple hypothetical example. Under this example a domestic wireless carrier that is serviced by Intermediary 1100 (in its role as ICV) wishes to ensure that any outgoing SS7 messages that are dispatched by Intermediary 1100 on behalf of the carrier (e.g., during the completion of a message exchange operation in support of a MS of the carrier) 'appear' to originate from a single network element within the wireless carrier and not, as would normally be the case, to originate from a single network element within Intermediary 1100 (as disclosed through the static 'from' SCCP-level address).

More specifically, the domestic wireless carrier would supply to Intermediary 1100 an E.164 address $A_1$ that the carrier wishes to be used as a 'from' SCCP-level address. The address would presumably be associated with the carrier through, for example, NPA-NXX or NPA-NXX-X assignment under the rules of the North American Numbering Plan (NANP).

Intermediary 1100 would supply the E.164 address to Teleglobe's provisioning group for Teleglobe to apply to their systems. Upon the completion of Teleglobe's provisioning steps, the E.164 address would (e.g., through GTT) be associated with the SS7 Point Code of the Intermediary's SS7 gateway platform.

Intermediary 1100 also preferably alters the configuration of its SS7 gateway platform to (a) recognize the E.164 address as being available for use and (b) associate the E.164 address to the supplying carrier.

Intermediary 1100 also preferably alters a rules set associated with its SS7 gateway platform to indicate replacement of the static value 1-703-9618308 with the carrier-supplied value $A_1$ in the 'from' SCCP-level address of all outgoing SS7 messages for the instant carrier. Note that this replacement applies only to those outgoing SS7 messages for the instant carrier; all other outgoing SS7 messages retain use of the static value 1-703-9618308.

Under an alternative example, a domestic wireless carrier that is serviced by Intermediary 1100 (in its role as ICV) wishes to have any outgoing SS7 messages that are dispatched by Intermediary 1100 on behalf of the carrier (e.g., during the completion of a message exchange operation in support of a MS of the carrier) 'appear' to originate from one of several virtual network elements within the wireless carrier and not, as would normally be the case, to originate from a single network element within Intermediary 1100 (again, as disclosed through the static 'from' SCCP-level address).

In this case, the domestic wireless carrier would supply to Intermediary 1100 (a) one or more E.164 addresses $A_1$, $A_2, \ldots A_n$ that the carrier wishes to be used as 'from' SCCP-level addresses and (b) the rules or logic that fully and completely proscribe the use of those addresses (e.g., when the first address $A_1$ is to be employed, when the second address $A_2$ is to be employed, etc.). The addresses would presumably be associated with the carrier through, for example, NPA-NXX or NPA-NXX-X assignment under the rules of the NANP.

Intermediary 1100 would supply the E.164 addresses to Teleglobe's provisioning group for Teleglobe to apply to their systems. Upon the completion of Teleglobe's provisioning steps, the E.164 addresses would (e.g., through GTT) be associated with the SS7 Point Code of the Intermediary's SS7 gateway platform.

Intermediary 1100 preferably alters the configuration of its SS7 gateway platform to (a) recognize the E.164 addresses as being available for use and (b) associate the E.164 addresses to the supplying carrier.

Intermediary 1100 preferably also alters a rules set for its SS7 gateway platform to include the carrier-supplied rules or logic that fully and completely proscribe the use of the replacement addresses—e.g., when the first address is to be employed, when the second address is to be employed, etc. Note that this replacement applies only to those outgoing SS7 messages for the instant carrier; all other outgoing SS7 messages retain use of the static value 1-703-9618308.

It will be readily apparent to one of ordinary skill in the relevant art that many other examples are easily possible.

While the narrative that was just presented concerned SMS, it will be readily obvious to one of ordinary skill in the relevant art that other uses of the Dynamic Message Addressing capability are easily possible. In fact, precisely because of the ubiquitous use of SS7 by telecommunications providers many alternatives are, in fact, easily possible.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of operating an inter-carrier vendor having an assigned E.164 address and that is configured to route messages using SS7 signaling using the assigned E.164 address, the method comprising the steps of:
   at an inter-carrier vendor, receiving from a domestic carrier an E.164 address to be used as a "from" SCCP-level address instead of a static E.164 address assigned to the inter-carrier vendor;
   providing the received E.164 address to an inter-network network so that the received E.164 address is thereafter associated with the inter-carrier vendor;
   associating the received E.164 address with the domestic carrier within the inter-carrier vendor; and
   for subsequent outgoing SS7 messages being routed on behalf of the domestic carrier, replacing the static E.164 address with the received E.164 address as the "from" SCCP-level address.

2. The method of claim 1, wherein the step of replacing is preformed in accordance with a predefined rules set or logic.

3. The method of claim 2, wherein the rules set is dynamically configurable.

4. The method of claim 2, wherein the step of replacing further comprises analyzing a data element in conjunction with the rules set.

5. The method of claim 4, wherein the data element comprises at least one of an identity of a source wireless carrier, an identity of a destination wireless carrier, a directory number of a source mobile station, and a directory number of a destination mobile station.

6. The method of claim 1, wherein the received E.164 address is indicative of a brand.

7. The method of claim 1, wherein the received E.164 address is used in the context of a wireless carrier merger or acquisition.

8. The method of claim 1, wherein the received E.164 is employed to account for augmented or enhanced billing offerings.

9. The method of claim 1, further comprising receiving a plurality of E.164 addresses from the domestic carrier.

10. The method of claim 9, wherein one of the plurality of E.164 addresses is selected to be used as the "from" SCCP-level address for outgoing SS7 messages in accordance with the rules set or logic.

11. In a process of routing a short message service (SMS) message through an inter-carrier vendor, a method of dynamically employing a "from" SCCP-level address in an outgoing SS7 message, comprising the steps of:
    coordinating with a domestic carrier to receive an E.164 address to be used as a "from" SCCP-level address instead of a static E.164 address that would otherwise be used by an inter-carrier vendor in sending SS7 messages;
    coordinating with an inter-network network to ensure that the E.164 address received from the domestic carrier is mapped to the inter-carrier vendor;
    associating the received E.164 address with the domestic carrier within the inter-carrier vendor; and
    for subsequent outgoing SS7 messages being routed by the inter-carrier vendor on behalf of the domestic carrier, replacing the E.164 address that would otherwise be used by the inter-carrier vendor with the E.164 address received from the domestic carrier as the "from" SCCP-level address.

12. The method of claim 11, wherein the step of replacing is preformed in accordance with a predefined rules set or logic.

13. The method of claim 12, wherein the rules set is dynamically configurable.

14. The method of claim 12, wherein the step of replacing further comprises analyzing a data element in conjunction with the rules set.

15. The method of claim 14, wherein the data element comprises at least one of an identity of a source wireless carrier, an identity of a destination wireless carrier, a directory number of a source mobile station, and a directory number of a destination mobile station.

16. The method of claim 11, wherein the E.164 address received from the domestic carrier is indicative of a brand.

17. The method of claim 11, wherein the E.164 address received from the domestic carrier is used in the context of a wireless carrier merger or acquisition.

18. The method of claim 11, wherein the E.164 address received from the domestic carrier is employed to account for augmented or enhanced billing offerings.

19. The method of claim 11, further comprising receiving a plurality of E.164 addresses from the domestic carrier.

20. The method of claim 19, wherein one of the plurality of E.164 addresses is selected to be used as the "from" SCCP-level address for outgoing SS7 messages in accordance with the rules set or logic.

* * * * *